2,365,022

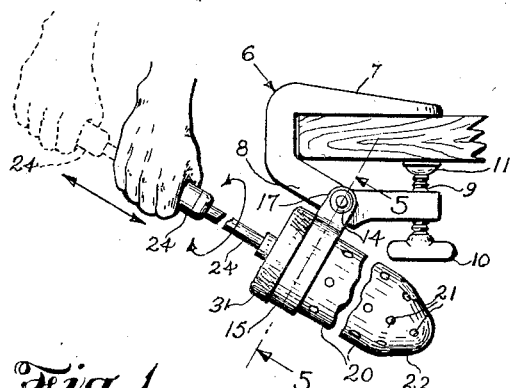
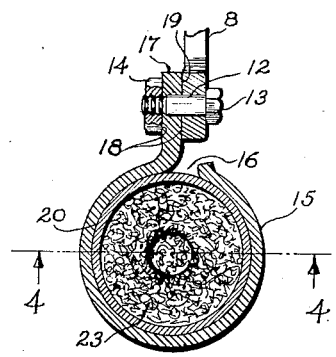
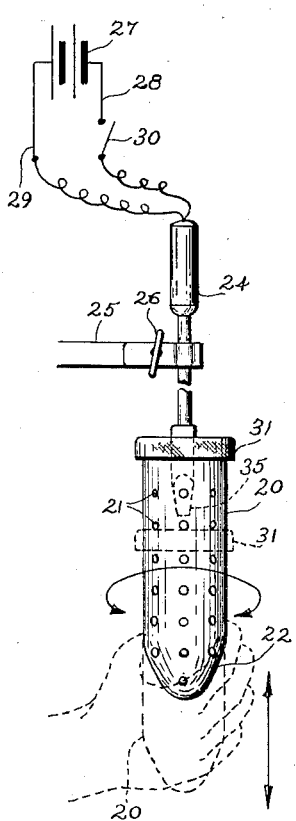
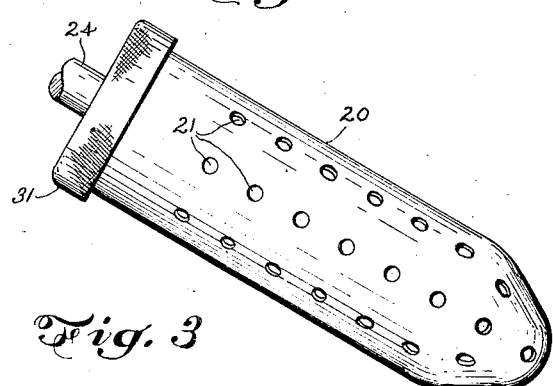
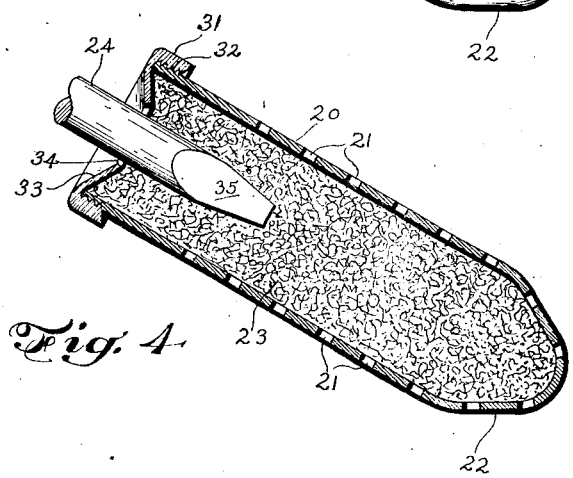
Fig. 1
Fig. 5
Fig. 3
Fig. 4
Fig. 2
Inventor:
Antoinette Sturtevant Patented Dec. 12, 1944

UNITED STATES PATENT OFFICE 2,365,022

CLEANER FOR SOLDERING IRONS

Antoinette Sturtevant, Forest Park, Ill.

Application October 23, 1943, Serial No. 507,387

2 Claims. (Cl. 15—210)

This invention relates to devices for cleaning the points of soldering irons.

One object of my invention is to provide a device for cleaning soldering iron tips to remove the incrustation formed when used for soldering, the said incrustation resulting from the impurities in the air which are attracted by the soldering irons and from the flux that is used for soldering purposes. It is necessary occasionally to clean the iron, and for that particular purpose, the present practice is to use rags, cloth, cotton waste or other similar materials for cleaning soldering irons. The soldering iron being hot while cleaning is considered a fire hazard, the attendant risk of first charring the cleaning rags may result in accidental conflagration which becomes a source of danger and the prevention thereof is vital.

It is an object of my invention to provide a device of the aforementioned character which has a cleaning medium which may be shredded or of "shaving-like" structure similar to steel wool or it may be a finely comminuted metallic or abrasive material such as sand, or powdered emery, or powdered oil stone, which may be used for this purpose, the said use of such material will prevent accidental fires from being started, and the cleaning substance being of a metallic or abrasive nature will provide a better cleaning action for removing incrustation and other deposits usually formed on the tips of soldering irons; the said incrustation defeats the efficient use of the iron and impedes clean cut soldering operations being performed, the resulting soldered joints being black or discolored rather than the bright silverlike finish which is desirable.

Another object of my invention is to provide a device of the aforementioned character which can be utilized for soldering when the iron is mobile and adapted to be moved to the work, as well as an article which may be utilized for static soldering when the iron is clamped in position and the work is brought to the iron.

Another object of my invention is to provide a device of the aforementioned character which is practical in construction, efficient in use and operation, and of such a simple combination of parts that it may be readily manufactured in quantities very economically.

Other features, objects and advantages resident in my invention will become apparent from an examination of the accompanying drawing and the ensuing description wherein like symbols are used to designate like parts and in which:

Fig. 1 represents a front view of my invention showing a soldering iron inserted therein.

Fig. 2 shows a front view of that portion of my invention which may be removed from clamping engagement and may be used when the soldering iron is clamped in position.

Fig. 3 is a front plan view of that portion of my invention which does the actual cleaning of the soldering iron.

Fig. 4 is a longitudinal cross-sectional view on the line 4—4 of Figure 5.

Fig. 5 is a transversal cross-sectional view on the line 5—5 of Figure 1.

Referring to the various views, 6 generally, characterizes my invention and is comprised of a clamp 7 having a lower arm 8 for attaching to a wood bench or other similar factory equipment. The lower arm 8 is provided with an extension adapted to receive the screw clamp 9 having the equalizer cup 11, and a hand knob 10 permitting clamping the said device rigidly in place. The cleaning unit designated 20 is fastened in a spring clip 15 having an extension 17 which is mounted and is suitably drilled at 12 to receive the fastening screw 13 and the nut 14, it being clamped to the bracket 8.

The surfaces of the spring clip extension 17 are, preferably, knurled as well as the surface 19 of the bracket 8. This knurling affords a secure position once the screw 13 and the nut 14 are clamped in place allowing the element 20 to be clamped at a suitable working angle.

The clamp 15 has an open throat portion 16 and is made to resiliently hold the member 20 and prevent its displacement when the soldering iron 24 is used as indicated at Figure 1, namely pushing it in and out of the container 20 as shown by the arrows while it is also subjected to a twisting motion or a rotating motion as indicated by the arrows in Figure 1, for efficiently cleaning the soldering iron. The inner diameter of the spring clip 16 is somewhat smaller than the outer body diameter of the element 20 so as to frictionally hold the same in place and permit removal thereof for purposes later to be elucidated.

Referring to Figures 3 and 4, it will be noted that the actual cleaning element is comprised of a tube 20 having perforations 21 in order to permit air to circulate therethru to cool the steel wool 23 which is packed therein in the form of a suitable cartridge which may be removed when the same is fouled and will no longer function efficiently. When comminuted metallic or abrasive material is used the holes 21 are not needed since such material will not absorb much heat.

The tip 35 of the soldering iron 24 is inserted therein and by the motions illustrated by the arrows a cleaning is effectuated in an expedient and rapid manner. The tube 20 is also tapered at the bottom in order to pack the cartridge material 23 so that ultimately when most of it is compressed and in the movement of the iron into element 20, the tapered portion 22 will tend to force the packing laterally toward the tip of the iron thus effectuating a pressure which will result in an ideal scraping operation.

The top of the member 20 is threaded to receive the cap 31 having a matching threaded portion 32 and a dished out portion 33 at the top as well as an enlarged opening 34 providing ample clearance for the diameter of tip 35 so that the same may be inserted and removed very easily, the dished out portion aiding in locating the same conveniently and with great facility.

In Figure 2, another method of using my device is indicated whereby the knurled portion of the cap 31 may be grasped by the fingers and element 20 removed from its resilient grip in the spring clip 15. When the iron 24 is clamped in place by clamp 25 which may be mounted on a work bench, the clamping screw 26 holding such irons that are used for production soldering. These irons are usually electrically heated as the iron illustrated which is connected to the conduits 28 and 29, in turn connected to a suitable source of electrical energy 27, a switch 30 being interposed therebetween to close and open the circuit.

In using a soldering iron mounted in this fashion, the work is usually brought up to it, and to facilitate cleaning it, the barrel element 20 with the cleaning cartridge is grasped in the hand after removal from the clamp 15, and brought up to the iron and then moved longitudinally in the direction of the arrows as well as rotationally clock-wise and counter clock-wise in order to effect a rapid cleaning action, after which the element 20 may be replaced in the spring clip 15 for use once again when necessary.

I believe, I have described and revealed the nature and operation as well as the use of my invention rather succinctly, it being susceptible of many alterations, modification, and improvements, I hereby reserve the right to all such modifications, alterations and improvements which come within the spirit and scope of my invention as embodied in the accompanying drawing, and as elucidated within the purview of the foregoing description; my invention to be limited only by the subjoined claims.

Having thus disclosed and revealed my invention what I claim as new and desire to secure by Letters Patent is:

1. In a device of the character described, soldering iron tip cleaning means comprising, a tubular element having a substantially conical closed end, a cap element secured to the open end of said tubular element provided with a funnel-shaped portion leading to a central opening to receive the tip of said soldering iron, and abrasive means packed within the said tubular means.

2. In a device of the character described, soldering iron tip cleaning means adapted to receive rotatably a tip of a soldering iron thereinto, and further adapted to be rotatably operative over the tip of said soldering iron, the said soldering iron tip cleaning means comprising, a cylindrical tube element having a threaded open end and a closed end of substantially conical configuration, a cap element having a cylindrical portion knurled on the outside and threaded on the inner portion secured to the open end of the said cylindrical element, the said cap element having a dished out top portion provided with an opening therein adapted to receive the tip of a soldering iron, and cleaning material in the assembly of said cap and tube elements.

ANTOINETTE STURTEVANT.